United States Patent
Doetsch et al.

(10) Patent No.: US 6,248,707 B1
(45) Date of Patent: Jun. 19, 2001

(54) METHOD FOR PRODUCING SODIUM PERCARBONATE

(75) Inventors: Werner Doetsch; Manfred Mathes, both of Bad Hoenningen; Helmut Honig, Geretsried; Gabriele Wasem, Hausen, all of (DE)

(73) Assignee: Solvay Interox GmbH, Hannover (DE)

( * ) Notice: Subject to any disclaimer, the term of this patent is extended or adjusted under 35 U.S.C. 154(b) by 0 days.

(21) Appl. No.: 09/331,010

(22) PCT Filed: Dec. 12, 1997

(86) PCT No.: PCT/DE97/02899

§ 371 Date: Aug. 13, 1999

§ 102(e) Date: Aug. 13, 1999

(87) PCT Pub. No.: WO98/27007

PCT Pub. Date: Jun. 25, 1998

(30) Foreign Application Priority Data

Dec. 16, 1996 (DE) ............................................. 196 52 243

(51) Int. Cl.[7] ............................ C11D 3/395; C01B 31/24

(52) U.S. Cl. ....................................... 510/375; 423/415.2

(58) Field of Search ..................... 510/375; 252/186.27, 252/186.43; 423/415.2

(56) References Cited

U.S. PATENT DOCUMENTS

| | | | | |
|---|---|---|---|---|
| 4,022,874 | * | 5/1977 | Mollard et al. | 423/415 P |
| 4,171,280 | * | 10/1979 | Maddox et al. | 252/186 |
| 4,190,635 | * | 2/1980 | Mesaros et al. | 423/415 P |
| 4,970,019 | * | 11/1990 | Crosby et al. | 252/186.27 |
| 6,162,781 | * | 12/2000 | Buscan et al. | 510/276 |

* cited by examiner

*Primary Examiner*—Yogendra Gupta
*Assistant Examiner*—John M Petruncio
(74) *Attorney, Agent, or Firm*—Crowell and Moring, L.L.P.

(57) ABSTRACT

A method for the "dry" production of sodium percarbonate (dry process), in which monohydrate crystals of sodium carbonate are reacted with a quasi-stoichiometric quantity of concentrated aqueous hydrogen peroxide solution, relative to the quantity of active oxygen required in the sodium percarbonate to be produced. This method can be combined to great advantage with subsequent compaction of the sodium percarbonate obtained. Sodium percarbonate products containing varying concentrations of active oxygen of at least 10 weight percent, particularly high active oxygen concentrations of above 14.5 weight percent, can be produced. The resulting sodium percarbonate products are distinguished in that they have remarkably advantageous dissolution rates, stabilities and compatibility with detergent bases, and are superior to conventional sodium percarbonates obtained, for example, by a crystallization process. The invention also relates to the sodium percarbonate products obtained and to detergent compositions containing such sodium percarbonate products.

44 Claims, No Drawings

METHOD FOR PRODUCING SODIUM PERCARBONATE

BACKGROUND OF THE INVENTION

The present invention relates to a method for the production of sodium percarbonate (abbreviated in the following to "PCS") with activated oxygen contents of at least 10% by weight and especially of more than 14.5% to 15.2% by weight, as well as to the PCS itself and the bleach and detergent compositions containing the new PCS product.

Sodium percarbonate is used as a bleaching component in powdered detergents, bleaches and cleaning agents. It is distinguished by a good water solubility as well as by a rapid release of hydrogen peroxide and is environmentally friendly, since its decomposition products do not contaminate the environment.

For sodium percarbonate, the empirical formula $Na_2CO_3 \cdot 1.5\ H_2O_2$ with a theoretical activated oxygen content of 15.28% by weight, is given in the literature. However, it should be taken into consideration here that sodium percarbonate, produced industrially from hydrogen peroxide and sodium carbonate, generally is not such a well-defined, homogeneous compound. Rather, on the one hand, it represents a mixture of compounds containing different amounts of water of hydration and having the formulas $$Na_2CO_3 \cdot 1.5\ H_2O_2$$

$$Na_2CO_3 \cdot 1.5\ H_2O_2 \cdot H_2O$$

$$Na_2CO_3 \cdot 2\ H_2O_2 \cdot H_2O$$

$$Na_2CO_3 \cdot 2\ H_2O_2$$

$$Na_2CO_3 \cdot x\ H_2O_2$$

and, on the other, depending on the manufacturing process, additionally contains a certain proportion of non-oxidized sodium carbonate as well as further additives, such as sodium sulfate or sodium chloride, which are the inevitable result of the manufacturing process. The properties of the product are determined decisively by the manufacturing conditions, as well as by the respective additives, not only in relation to the stability, but also, for example, with respect to the activated oxygen content, the solubility and the bulk density or particle size of the sodium percarbonate. For example, the attainable activated oxygen content in industrial grade sodium percarbonate is 13.4% to 14.5% by weight only in favorable cases; due to the additives inevitably resulting from the manufacturing process (sulfate, sodium chloride) as well as to the stabilizing measures, the attainable activated oxygen content frequently is much lower. The solubility of the sodium percarbonate, which is inherently good, is also frequently decreased, for example, by the presence of other salts, which inevitably result from the manufacturing process, such as sodium carbonate, sodium sulfate and sodium chloride. Moreover, the bulk density attainable or the particle size of the sodium percarbonate generally can be varied only slightly by the manufacturing methods of the state of the art and mostly is limited from the very start to a narrow range by the type of method or by the sodium carbonate used.

However, there has been an increasing desire for sodium percarbonates with a high activated oxygen content and different bulk densities or particle sizes to meet the different requirements of the detergent manufacturers, for example, for uses in light powder detergents with a low bulk density or in compact detergents with a high bulk density of the detergent, bleach and cleaning agent components. In particular, it is also necessary here to match the bulk densities of the individual components to one another, in order largely to preclude demixing, which would necessarily occur with components of different bulk densities.

Three technologies are known in the state of the art for the production of sodium percarbonate, namely crystallization methods, spraying methods and dry methods.

As a rule, sodium percarbonate is produced by the crystallization method. For this, a solution or suspension of sodium carbonate is reacted with hydrogen peroxide at 10° to 20° C. and crystallized in the presence of stabilizers, such as water glass, inorganic or organic phosphonic acids, etc. Because of the good solubility of the sodium percarbonate, it is, however necessary, for increasing the yield, to salt out the sodium percarbonate from the reaction mixture. For this purpose, according to the state of the art, preferably sodium chloride is added to the reaction mixture at a concentration of about 240 g/liter. It is, however, difficult to control the crystallization, so that, for the purpose of an advantageous shape of the crystal face, the addition of so-called crystallization improvers, such as polyphosphates or polyacrylates, is recommended. The crystallized sodium percarbonate is then centrifuged off and dried by conventional methods, for example, in a fluidized bed. However, the PCS, obtained by crystallization methods, is not optimum for many applications and its properties frequently suffer because it inevitably contains sodium chloride due to the manufacturing process.

For the spraying method of producing sodium percarbonate, it is not necessary to filter or centrifuge in order to remove the sodium percarbonate from the mother liquor. Rather, for this spraying method, an aqueous solution, or optionally also a suspension of low concentration of sodium carbonate and hydrogen peroxide, is dried in a spray drier. As a rule, however, spray dried products have a very low bulk density of only about 0.35 kg/liter and therefore cannot be used as such for the detergent formulations of today, which increasingly contain granular components having a higher bulk density. Moreover, much water must be removed when spraying solutions. This requires additional energy.

In modifications of the spraying method, solutions of sodium carbonate and hydrogen peroxide, for example, are sprayed continuously onto a bed of sodium percarbonate, previously put down and fluidized with hot air. The spraying and drying step can be carried out in one or two steps. In a further modification of the spraying method, solutions of sodium carbonate and hydrogen peroxide are fed through separate nozzles into a reaction chamber. A hot mixture of air and carbon dioxide is passed simultaneously through the reaction chamber. However, a fairly porous sodium percarbonate is obtained by this method, which does not meet the requirements for detergent compositions of the present standards with respect to bulk density and abrasion resistance.

According to the so-called dry methods, sodium percarbonate is produced by reacting hydrate water-free sodium carbonate with a concentrated solution of hydrogen peroxide of 50 to 80% by weight and evaporating the small amounts of water, which are released, already during the reaction. For this method, the reaction mixture is substantially dry during the whole of the reaction. The method can be carried out, for example, in mixers, fluidized bed reactors or also in tubular reactors with devices for feeding hydrogen peroxide. Aside from the long reaction times, this method has the disadvantage that there is no purification of the sodium carbonate produced in this manner, so that additional measures have to be taken to stabilize the product, for example, by adding special stabilizers already during the reaction. It is particularly disadvantageous that hydrogen peroxide must be used in a large excess, in order to obtain a PCS with an adequate content of activated oxygen. Moreover, this method is not very variable with respect to the granulate properties of the sodium percarbonate, for example, with respect to the bulk density and particle size, since the shape of the sodium percarbonate granulate corresponds essentially (that is, aside from slight roundings caused by the reaction) to the shape of the granulate of the sodium carbonate used. Therefore, especially when manufacturing sodium percarbonate granulates with a high bulk density for compact detergents, heavy sodium carbonate must be used, for which, however, only a little surface area is available for the reaction with hydrogen peroxide. The reaction is thus incomplete, so that only a lesser content of activated oxygen, as well as only inhomogeneous products with a higher proportion of sodium carbonate, which is distributed inhomogeneously, are obtained. Moreover, the alkalinity adversely affects the stability of the product.

SUMMARY OF THE INVENTION

It is therefore an object of the present invention to overcome the disadvantages of the state of the art with respect to the manufacture of sodium percarbonate and to make available an efficient method, which can be carried out with high flexibility, for the dry manufacture (dry method) of sodium percarbonate with advantageous properties. The dry method, proposed pursuant to the invention, shall especially make it possible to make available a high grade sodium percarbonate at the most efficient yield of activated oxygen, with variable and especially, however, high activated oxygen contents, and with variable granulate parameters in accordance with the intended use.

This object is achieved by the inventive method for the manufacture of sodium percarbonate also described hereinafter, as well as by the novel sodium percarbonate with the unexpected, favorable properties, given in the claims and by the given solid bleach and detergent compositions.

The inventive method for the dry manufacture of sodium percarbonate with an activated oxygen content of at least 10% by weight is distinguished owing to the fact that solid sodium carbonate monohydrate is reacted to with an amount, quasi stoichiometric with respect to the desired content of activated oxygen in the sodium percarbonate, of especially 50 to 70% by weight of aqueous hydrogen peroxide solution at reaction temperatures up to a maximum of 80° C. in mixing equipment into a pasty or doughy composition of moist sodium percarbonate and that subsequently, by drying and/or granulating, a sodium percarbonate with an activated oxygen content of 10 to 15.2% by weight and preferably of more than 14.5% to 15.2% by weight and with the desired particle parameters, such as bulk density and average particle diameter, is obtained.

The inventive method can be carried out in any mixer, which permits the solid (especially the sodium carbonate monohydrate and the PCS formed) and the hydrogen peroxide used to be mixed sufficiently rapidly and intensively. The following mixers, for example, are suitable: a vessel with stirrer suitable for flowable media, for example, a vessel with a propeller, disk, paddle, agitator or lattice stirrer; intensive mixers, such as high-speed rotor-stator mixers and turbomixers, which additionally may be equipped with a knife head for shattering larger agglomerates, are very effective. Fast or intensive mixing is understood to be any mixing intensity, which corresponds to stirring at an rpm of initially at least about 100 rpm and especially of about 100 to 150 rpm. Preferred mixers are equipped within kneaders, with which the pasty to doughy composition, which is formed during the reaction, can be processed particularly well and homogeneously. The reaction can be carried out batchwise as well as continuously. The solid sodium carbonate monohydrate is supplied to the mixer advisably by means of a metering screw, if the reaction is to be carried out continuously. For the batchwise reaction, the sodium carbonate monohydrate is added to the mixer. For both variations of the method, that is, for the continuous and for the batchwise mode of operation, the aqueous solution of hydrogen peroxide is supplied in the amount required preferably over a nozzle, particularly a two-material nozzle, to the mixer in the required amount. For the continuous method, the rate of addition is matched to the addition of the sodium carbonate monohydrate, to the residence time of the reaction mixture in the mixer and to the amount per unit time of PCS formed, which is drawn off continuously.

To control the temperature of the exothermic reaction between the sodium carbonate monohydrate and the hydrogen peroxide, the mixer can be equipped with cooling equipment. This is advisable particularly in order to adsorb the heat of reaction in order to protect the activated oxygen content in the hydrogen peroxide and in the sodium percarbonate being formed. For the cooling, which can be accomplished advisably with a simple cooling jacket, the cooling capacity of tap water usually is sufficient, so that usually no further energy has to be supplied for the cooling. In the course of the reaction, the reaction temperature may rise up to 80° C. without affecting the product properties, particularly the activated oxygen contact. The temperature control during the reaction is not a problem and the reaction can therefore also be carried out above 20° C., without affecting the product. As a result, a rapid procedure, that is, a relatively rapid mixing of sodium carbonate monohydrate and hydrogen peroxide becomes possible. Temperatures higher than 80° C. should, however, be avoided as otherwise the yield of activated oxygen is decreased due to premature decomposition of the hydrogen peroxide. Advisably, the reaction temperatures during the exothermic reaction are kept between room temperature and a maximum of 80° C. and preferably are higher than 20° C. and not greater than 80° C.

DETAILED DESCRIPTION OF PREFERRED EMBODIMENTS

An essential distinguishing feature of the inventive method consists therein that a special form of sodium carbonate, with an essentially defined content of the water of hydration, is used as the sodium carbonate monohydrate starting material. Advisably, the sodium carbonate monohydrate is obtained by conditioning sodium carbonate ($Na_2CO_3$), that is, by reacting the anhydrous form of sodium carbonate with up to an approximately 1.5-fold molar amount of water. For this purpose, preferably pre-heated sodium carbonate (for example at waterbath temperatures up to about 100° C.) is reacted with the calculated amount of boiling water in a mixer for a sufficiently long period of time and the reaction to form the sodium carbonate monohydrate is subsequently checked analytically by known methods, such as by DSC analysis and titration of the total alkalinity. The conditioning of sodium carbonate to the monohydrate for the inventive method is independent of the type of sodium carbonate, which is to be conditioned. For example, super light sodium carbonate, with a bulk density less than 0.50 kg/liter, for example, 0.20 kg/liter to 0.48 kg/liter, slightly calcined sodium carbonate with a bulk density of, for example, 0.50 to 0.55 kg/liter and heavily calcined sodium carbonate, with a bulk density of 1.0 to 1.1 kg/liter can be conditioned. The inventive method proceeds particularly advantageously when sodium carbonate monohydrate is used, which was obtained by conditioning light forms of sodium carbonate, especially, for example, light sodium carbonate with bulk densities of about 0.50 to 0.55 kg/liter or also super light sodium carbonate with a bulk density less than 0.50 kg/liter. After being conditioned to sodium carbonate monohydrate, these light forms of sodium carbonate can be reacted largely completely with hydrogen peroxide into a particularly homogeneous sodium percarbonate. The use of sodium carbonate monohydrate from light forms of sodium carbonate makes a rapid and complete reaction with hydrogen oxide possible. The reaction is completed within a few minutes up to a maximum of about 1.5 hours and especially already within 1 hour, depending on the amount to be reacted. As shown in the examples, kilogram amounts can be reacted within minutes using conventional water cooling; for example, 2 kg of light sodium carbonate monohydrate can be reacted completely with water cooling within less than about 15 minutes. However, even when heavy calcined sodium carbonate is used for the conditioning to the monohydrate, short reaction times for the subsequent reaction with hydrogen peroxide are possible and largely homogeneous PCS particles can be obtained, provided that, if necessary, the conditioning time is extended so that the water, made available for the hydration, can adequately penetrate the sodium carbonate particles or, alternatively or in addition, that a slight excess of water is made available for the hydration; as with the conditioning of lighter sodium carbonate, the characteristics of the sodium carbonate monohydrate are checked by DSC analysis and by titration of the total alkalinity.

The ratio of sodium carbonate monohydrate to the activated oxygen content in the hydrogen peroxide is controlled in the inventive method in such a manner, that the molar ratios correspond to the activated oxygen content in the PCS, which is to be attained. If necessary, only a slight excess of hydrogen peroxide of the order of up to about 5% is required. Since the inventive method ensures an essentially complete yield of activated oxygen, the use of an approximately stoichiometric amount of hydrogen peroxide is sufficient (based on the sodium percarbonate with the theoretical empirical formula $Na_2CO_3 \cdot 1.5\ H_2O_2$; theoretical activated oxygen content of 15.28% by weight) and expensive hydrogen peroxide excesses can be avoided. For molar ratios of hydrogen peroxide to sodium carbonate monohydrate of approximately 1.0, sodium percarbonates with activated oxygen contents of about 10% by weight are obtained. In a preferred embodiment of the invention, the molar ratio of hydrogen peroxide to sodium carbonate is adjusted to about 1.5 to 1.52, so that an activated oxygen content in the sodium percarbonate of at least 14% by weight and especially of more than 14.5% to 15.2% by weight is attained. For the inventive method, the concentration of the aqueous hydrogen peroxide used is approximately 50% to 70% by weight, concentrations of 55% to 65% by weight being preferred. As a rule, the hydrogen peroxide is stabilized by a known method; all activated oxygen stabilizers, known in the art, are suitable, including, for example, Turpinal SL.

The reaction products of sodium carbonate monohydrate and hydrogen peroxide can be dried and granulated by known methods and, depending on the method and equipment used, controlled in such a manner, that a sodium percarbonate with any particle size (=average particle diameter) of about 150 to about 1,300 μm is obtained. In a preferred embodiment of the invention, especially sodium percarbonate with particle sizes of 350 to 1,300 μm is produced. The inventive method thus makes it possible to produce sodium percarbonates with particle size ranges for light detergents or for compact detergents with particle sizes above about 550 to 600 μm, especially from about 640 to 1,100 μm and preferably with particle sizes from about 800 to 1,000 μm. The granulation conditions, which must be adhered to for this purpose, are not critical and correspond to the usual conditions of the respective granulation equipment used. Accordingly, sodium percarbonates with a bulk density of 0.2 kg/liter to 1.1 kg/liter and preferably of 0.5 to 1.1 kg/liter can be produced by the inventive method. Further particularly preferred particle sizes and bulk densities are described further below in conjunction with the inventive PCS products.

The drying and granulating steps can be carried out, for example, in a turbo dryer (granulating dryer), as well as in other conventional short-time drying equipment and granulating equipment under the usual conditions. For example, the drying can also be carried out in fluidized bed dryers or in circulating air dryers. For all variations of the inventive method, the granulation can be carried out in the usual manner, for example, as dry granulation in a compacting method or as moist granulation (build-up granulation) in granulation mixers such as plowshare mixers or V mixers. In a combined refinement of the granulating and drying steps, the procedure is carried out in a turbo dryer which, in principle, is a turbo mixer equipped with a heater. The method of operation in the turbo dryer is recommended particularly for the continuous mode of operation, in which the reaction slurry or paste is dried and, at the same time granulated immediately after the reaction. Alternatively, the granulation can also be carried out by an extrusion method immediately after the mixing of the starting materials. In the granulation/drying step, granulation aids (such as silicates) and stabilizers (such as organic phosphonic acids or phosphonates) can, if desired, be added. As a rule, however, they are not necessarily required for the PCS produced pursuant to the invention.

In a particularly preferred embodiment of the invention, the method is distinguished owing to the fact that the sodium percarbonate, obtained after the drying—for this variation of the invention, for example, by circulating air—is subject to compacting with subsequent dry granulation. This method of producing a sodium percarbonate product is distinguished by the fact that, in a first step (=the reaction step) a sodium percarbonate is produced and dried according to the reaction method described above and, in a second step (=compacting and dry granulation step) the sodium percarbonate, obtained after drying in the first step, is compacted, if so desired, into scabs, optionally with the addition of up to 1% by weight of a lubricant, preferably an alkali and/or alkaline earth metal stearate. Subsequently, the scabs are obtained by dry granulation, breaking and screening as a sodium percarbonate granulate with the desired particle parameters, such as the bulk density and the average particle diameter.

According to this variation of the inventive method, largely dry primary particles are subject to a compression (compacting) and consolidated by the action of the press pressure used for this purpose. By these means, the desired agglomeration of the primary particles used is brought about. Since the agglomeration comes about by compression and exerting a pressure, the consolidating compressing process is also referred to as compacting or compression and pressure agglomeration or, in the event that granulates are produced, also as compression or pressure granulation. The compression agglomeration method of producing agglomerates or granulates thus differs from the so-called build-up agglomeration methods (build-up granulation methods), for which the adhesion between the particles is brought about essentially without the action of pressure exclusively by gluing with a liquid (such as water) and/or with binders.

The temperature range, in which the compacting can be carried out, corresponds to the temperature range, in which there is good thermal stability of the activated oxygen-containing compounds used and the method can be carried out without problems from a safety point of view. The compacting of the sodium percarbonate particles is carried out, for example, in an appropriate development of the invention at ambient temperature. In this temperature range, the method can be carried out without problems with respect to the activated oxygen content of the primary sodium percarbonate particles, which are to be compressed; in contrast to conventional PCS crystallization methods of the state of the art, losses of activated oxygen, which would lower the quality of the product, are not observed in the PCS produced pursuant to the invention.

The magnitude of the pressure to be applied can be selected freely within wide limits and can therefore be adapted to the special desires or requirements with regard to the product; in other words, the pressure is co-determined by two specifications. On the one hand, the minimum pressure applied should be sufficient to endow the agglomerate of the primary particles with adequate mechanical strength and bulk density. The minimum pressure to be applied for achieving the desired properties depends on the nature of the compression equipment used and on the adhesive properties of the product and, with respect to the desired processing and product properties, can easily be determined by the expert in a few preliminary experiments. The upper limit of the pressure applied is limited by the maximum pressure technically attainable or permitted by the equipment used for the compacting and by the adhesive properties of the product. In one embodiment of the invention with a roll press, given by way of example, the amorphous primary particles of sodium percarbonate, for example, are consolidated by compression at pressures of at least 50 bar to a maximum of 150 bar. Preferably, pressures of 80 to 120 bar are employed.

Compared to the fine primary particle debris of PCS, the agglomerates obtained pursuant to the invention are molded products which, after being comminuted by breaking and screening, have a lesser tendency to dust, adhere, bake together and demix, can be dispensed and transported well, exhibit good flowability and have a defined bulk density. By means of the inventive method, product properties, such as the shape and size of the granulate and the bulk density of the PCS can be adapted to the requirements of different applications or to other requirements of the market. The desired product properties decisively determine the most appropriate compacting method in each case.

For the compacting, all usual compression/agglomeration equipment can be used. Admittedly, it is possible here to agglomerate the primary particles also by pressing them moist, optionally with addition of small amounts of liquid, binder, lubricant, further auxiliary materials and other desirable or appropriate additives. Preferably, however, the advantages of the invention, when such compacting methods are used, come to the fore exclusively when the primary particle material is pressed dry, since the stability of the product (particularly the activated oxygen stability) cannot be negatively affected in this method by liquids present or added (especially water) and there is no need to follow the compacting by a subsequent drying step. It is a further advantage that the binder, lubricant and/or other auxiliary material admittedly can be added, if desired, for the dry compression agglomeration method, but on the other hand, however, are not absolutely essential for carrying out the method. Accordingly, undesirable property changes, which may be brought about by the additives and auxiliary materials in compressed percarbonate, are avoided. On the other hand, however, it is entirely possible to mix other desirable additives, which modify the agglomerates in an appropriate manner, such as advantageously up to about 1% by weight of magnesium stearate, homogeneously, before the compression agglomeration, with the microcrystalline percarbonate particles, which are to be compressed.

For example, roll presses (rolling pressure machines), such as smoothing rolls, structure rolls or molding rolls (briquetting rolls) are suitable compacting equipment. This equipment can be operated with or optionally also without forced feeding equipment for the primary particles that are to be compressed. Depending on the compacting equipment used, the primary particles are compressed under pressure in defined molds, for example, into dense, smooth or structured panels, that is, into so-called scabs. The scabs are subsequently comminuted to a granulate of the desired size.

In a particularly appropriate refinement of the compacting method, roll presses are used; structured rolls are preferred. The structured rolls are corrugated or continuously profiled rolls for producing smooth or profiled panels (scabs), ribbons or compacted material. For the structured rolls, slightly profiled or more heavily profiled rolls can be used, the latter in an open or closed adjustment. More or less smooth, slightly or more heavily structured (such as waffle-like) scabs, corrugated panels or, in the case of rolls, profiled uniformly over the whole width in a closed adjustment, also rods can be obtained.

Since the products, obtained by the compacting, do not yet have the desired shape, such as, in particular, scabs, corrugated panels or also rods, the latter are comminuted by known methods into granulates of the desired particle size and bulk density. Pancake or scab breakers for coarse granulation or granulating screens for a fine granulation are suitable for the comminution.

If desired, the sodium percarbonate granulates, produced by the inventive method, can still be provided in a known manner with coatings. Suitable coating materials are, for example, the materials described in the art, such as borates, salts, such as sodium carbonate, sodium chloride, sodium sulfate and their mixtures, organic coating materials, such as lactobionic acid and its derivatives. If an additional coating of the sodium percarbonate granulates, produced pursuant to the invention, is desired, then the coating procedure can advantageously and in a known manner follow the granulation step.

The invention also relates to novel sodium percarbonates, which are distinguished by advantageous properties, which could not be achieved previously by the methods of the state of the art. The inventive sodium percarbonate (PCS) is distinguished by an activated oxygen content of more than 14.5% to 15.2% by weight, calculated without optionally added granulating aids or coating materials.

In one variation, this novel PCS is distinguished by a dissolving rate of at least 95% after one minute and at least 99% after two minutes (in each case, standard conditions, 2 g, 15° C.). In a different variation, the novel PCS is distinguished by its exothermic DSC peak above about 155° C. and preferably higher than or equal to 159° C., particularly at temperatures ranging from 159° to 162° C. In a further variation, the novel PCS is distinguished owing to the fact that it has a loss of stability of less than 6.2%, preferably of 3.4% to 5.1%, measured under standard conditions (105° C., 2 hours).

The new PCS products have a series of further advantageous properties. For example, the sodium percarbonate, in particular, has an average particle diameter of 550 to 1,100 μm and preferably of 640 to 1,000 μm. The bulk density of the sodium percarbonate preferably is 0.85 to 1.1 kg/liter. Furthermore, the sodium percarbonate has an advantageous abrasion value of less than 5% (measured under standard conditions).

In one variant of the invention, the sodium percarbonate is distinguished owing to the fact that it contains up to 1% by weight of a lubricant from the group of alkali or alkaline earth metal stearates, introduced during the granulation and that it has bulk densities of 0.93 to 1.1 kg/liter. This sodium percarbonate has an abrasion value of less than 8% (measured under standard conditions).

The novel sodium percarbonates can be produced according to the inventive method described above, especially according to the variation of the method with compacting and dry granulation. If the sodium percarbonate is produced according to the advantageous variation of the method with compacting and dry granulation, the compacting can be carried out with or without the addition of lubricants.

If the sodium percarbonate is produced according to the advantageous variation of the method with compacting and dry granulation without the addition of lubricants during the compacting and dry granulation, it is distinguished in one variation by a stability loss of less than 6.2%, measured under standard conditions (105° C., 2 hours). In a further variation, the sodium percarbonate, obtained without the addition of lubricant during the compacting and dry granulation, has an average particle size of 550 to 1,100 μm and preferably of 640 to 1,000 μm. In a further variation, the sodium percarbonate, which can be obtained by the method without the addition of lubricants during the compacting and dry granulation, has a bulk density of 0.85 to 1.1 kg/liter. This sodium percarbonate is furthermore distinguished by an abrasion value of less than 5% (standard conditions).

In a further variation of the invention, the sodium percarbonate is produced by the variation of the method with compacting and dry granulation with addition of lubricants during the compacting. The sodium percarbonate, which can be obtained by this method, is distinguished in a variation of the invention, owing to the fact that it can be obtained with addition of up to 1% by weight of a lubricant during the compacting and dry granulation, preferably with the addition of alkali and/or alkaline earth metal stearate, that it has an activated oxygen content of more than 14.5% by weight and preferably of more than 14.8% by weight and a loss in stability of not more than 12.0% (measured under standard conditions: 105° C., 2 hours). In a different variation of the invention, the sodium percarbonate, which can be obtained with the addition of up to 1% by weight of a lubricant during the compacting and dry granulation, preferably by the addition of alkali or alkaline earth metal stearate, is distinguished owing to the fact that it has an activated oxygen content of more than 14.5% by weight up to 15% by weight and preferably of more than 14.8% by weight up to 15.0% by weight and an average particle diameter of 800 to 1,000 μm.

In a different variation of the invention, the sodium percarbonate, which can be obtained with the addition of up to 1% by weight of a lubricant during the compacting and dry granulation and preferably with the addition of alkali or alkaline earth metal stearate, has an activated oxygen content of more than 14.5% by weight up to 15% by weight and preferably of more than 14.8% up to 15.0% by weight and a bulk density of 0.95 up to 1.1 kg/liter. This sodium percarbonate has an advantageous abrasion value of not more than 8% (measured under standard conditions).

The inventive, novel PCS products are outstandingly suitable for use in solid bleach and detergent compositions. The invention therefore also relates to solid bleach or detergent compositions, containing 0.5% to 40% by weight and preferably 5% to 25% by weight of the inventive sodium percarbonate and 99.5% to 60% by weight and preferably of 95% to 75% by weight of formulation aids and auxiliary materials, which are customary in bleach or detergent compositions and are selected from the group comprising the surfactants, builders, bleach activators, peracid bleach precursors, enzymes, enzyme stabilizers, anti-redeposition agents and/or compatibilization materials, complexing and chelating agents, soap foam regulators and additives, such as optical brighteners, opacifiers, corrosion inhibitors, antistats, dyes and bactericides. Because of the outstanding stability of the inventive sodium percarbonate in the presence of the components of detergents, it is advantageously suitable for bleach and detergent compositions, which contain the sodium percarbonate in the presence of builders from the group of zeolites. The particle sizes and bulk densities of the inventive sodium percarbonate make it possible to use the latter advantageously in compact detergent compositions.

In the inventive compositions, a wide selection of zeolite builders can be used, which are alternatively sometimes also referred to as aluminosilicate builders. Suitable zeolites usually have a significant calcium or alkaline earth metal ion exchange capacity (to eliminate water hardness). The ion exchange capacity is expressed here as calcium carbonate equivalents, and it is at least 150 mg of calcium carbonate per gram and, for preferred zeolites, the ion exchange capacity is 200 to 250 mg of calcium carbonate equivalents per g. The zeolites are usually described by the general empirical formula $M_z((AlO_2)_z(SiO_2)_y) \cdot x H_2O$, in which M represents an alkali metal, preferably sodium, z and y are whole numbers of at least 6 with a molar ratio of y:z of 1:1 to 2:1 and x is a whole number of at least 5 and preferably of 10 to about 280. Many zeolites are hydrated and contain up to about 30% by weight of water, of which about 10 to 25% by weight is bound in the zeolite. The zeolites can be amorphous; however, the majority of preferred zeolites have a crystalline structure. Although certain aluminosilicates occur naturally, most aluminosilicates are synthetic. For example, zeolite A, zeolite X, zeolite B, zeolite P, zeolite Y, zeolite HS and zeolite MAP are suitable crystalline zeolites with a well known structure and formula. The amount of zeolite in the inventive bleach and detergent compositions is at least 5% by weight and in many cases at least 10% by weight, based on the total composition. Usually, the amount of zeolite is not greater than about 60% by weight and frequently not greater than 50% by weight; in particular, the amount of zeolite in the composition is not higher than 40% by weight, based on the total composition.

In a preferred refinement of the invention, the inventive sodium percarbonates, which contain one or more zeolites as builder, are described for such bleach and detergent compositions. Nevertheless, the bleach and detergent compositions in a general embodiment of the invention can likewise contain the inventive sodium percarbonate also with amorphous zeolites or with laminated silicates in the weight ranges given above. Suitable laminated silicates, especially those with a crystalline nature, frequently correspond to the general formula $Na_2Si_xO_{2x+1} \cdot y\ H_2O$ or the corresponding compounds, in which the sodium ion is replaced by a hydrogen ion. In this formulation, x ranges particularly from 1.9 to 4 and y, in particular, from 0 to 20. The laminated silicates can be used in mixtures with zeolite builders as well as without zeolite builders in the bleach and detergent compositions.

In the bleach and detergent compositions, which contain the inventive sodium percarbonate, the zeolite builders can be replaced by non-zeolite builders in a different, more general embodiment of the invention. Such detergent builders can, for example, be the already described laminated silicates, alkali metal phosphates, especially tripolyphosphates, but also tetrapyrophosphates and hexametaphosphates, which exist, particularly in the form of the sodium salt, alkali metal carbonates and preferably sodium carbonate, alkali metal silicates and alkali metal borates and preferably sodium borate. A further group of builders, which may be contained in the bleach and detergent compositions, are organic chelating builders, such as aminopolycarboxylates and aminopolymethylene phosphonates or hydroxyphospho-nates, including nitrilotriacetate or trimethylene phosphonate, ethylenediamine tetracetate or tetramethylene phosphonate, diethylenetriamine pentamethylene phosphonate or cyclohexane-1,2-diaminotetramethylene phosphonate, which normally are present partly or completely in the form of the sodium salt. Chelating carboxylate builders comprise monomeric and oligomeric carboxylates, including glycolic acid and ether derivatives, such as salts and derivatives of succinic acid, tartaric acid, citrates, carboxy derivatives of succinates, and polyaspartates. Further examples are ethane tetracarboxylates and propane tetracarboxylates and various sulfosuccinates. Said chelating builders can be present in relatively low amounts in the bleach and detergent compositions, for example, for reinforcing the builder properties and the peracid-stabilizing effect. Amounts of 1 to 10% by weight are suitable for this purpose. However, larger amounts of up to 40% by weight and preferably ranging from 5 to 20% by weight, can also be used.

The inventive bleach and detergent compositions furthermore usually contain one or more surfactants, which may be contained in amounts of 2% to 40% by weight and especially in amounts of 5% to 25% by weight. As surfactants, all the usual surfactants from the group of anionic, cationic, nonionic, zwitterionic, amphoteric and ampholytic surfactants come into consideration, as do the natural or synthetic soaps. Examples of anionic surfactants are the carboxylic acid soaps, alkylarylsulfonates, olefinsulfonates, linear alkylsulfonates, hydroxyalkylsulfonates, long-chain alcohol sulfates, sulfated glycerides, sulfated ethers, sulfosuccinates, phosphate esters, sucrose esters and anionic fluorinated surfactants. Examples of cationic surfactants comprise quaternary ammonium or pyridinium salts, which contain at least one hydrophobic alkyl or arylalkyl group. Nonionic surfactants or, for example, condensates of long-chain alcohols either with polyethylene oxides or with phenol, or condensates of long-chain carboxylic acids or amines or amides with polyethylene oxide or corresponding compounds, in which the long-chain unit is condensed with an aliphatic polyol, such as sorbitol, or are condensation products of ethylene or propylene oxides or fatty acid alkanolamides and fatty acid amine oxides. Amphoteric or zwitterionic surfactants are, for example, sulfonium and phosphonium surfactants, which may be substituted with a further solubilizing anionic group. The above listing is given by way of example and is not to be considered as final.

Further optional components of the bleach and detergent compositions are, for example, as already named: anti-redeposition agents, bleach activators, optical brighteners, enzymes, softeners, scents, dies and optionally also processing aids. The optional components, with the exception of the processing aids, which form a separate component, usually are contained in amounts of up to about 20% by weight, based on the composition; usually, up to 10% by weight are sufficient. The processing aids, as a separate component, can optionally constitute 0 to 40% by weight of the composition. Anti-redeposition agents usually are, for example, methyl, carboxymethyl or hydroxyethyl derivatives of cellulose or polyvinylpyrrolidone, or polycarboxylic acid polymers, such as copolymers of maleic anhydride and methacrylic acid or ethylene vinyl ether or methyl vinyl ether. Usual bleach activators are, for example, O-acyl or N-acyl compounds, which form a peracid by reaction with sodium percarbonate, especially TAED, SNOBS and its isononyl analogs, TAGU and sugar esters. Optical brighteners are, for example, suitably substituted aminostilbenes and especially triazineaminostilbene. The enzymes can be selected from the group of amylases, neutral or alkaline proteases, lipases, esterases and cellulases, which in each case are commercially available. Softeners are, for example, water-insoluble tertiary amines, sometimes in conjunction with long-chain quaternary ammonium salts and/or high molecular weight polyethylene oxides. The processing aids usually are sodium and/or magnesium sulfate. In concentrated or ultra concentrated compositions, however, the processing aids constitute only a relatively small proportion of not more than 5% by weight; in traditional compositions, the proportion may well be 20% to 40% by weight.

The inventive bleach and detergent compositions can be produced in any conventional manner, for example, by dry mixing of the particulate sodium percarbonate and the desired components, which can also be preprocessed as a pre-mixture or as a pre-formulation in the usual manner.

The inventive method, as well as the sodium percarbonate, produced pursuant to the invention, are distinguished by the following advantages:

By means of the invention, a simple method, which can be carried out in an economic manner, is made available for the batchwise or continuous production of essentially homogeneous PCS particles or granulates with variable activated oxygen contents of 10% to 15.2% by weight and especially also with high activated oxygen contents of more than 14.5% to 15.2% by weight. The inventive method saves energy since, on the one hand, cooling energy is not required during the reaction because the temperature is controlled by normal water cooling alone and, on the other, only a little water has to be evaporated in order to dry the product. In contrast to so-called wet methods (crystallization methods), chloride-free PCS products are formed pursuant to the invention, as a result of which the danger of corrosion in the plant is reduced. In contrast to the wet process, no effluent, which has to be disposed of, is formed by the inventive method. On the other hand, alkaline effluent, containing hydrogen peroxide and chloride, is formed by the wet process; before it can be disposed of, it must still be neutralized and the hydrogen peroxide portion may still have to be decomposed. In contrast to the so-called dry method, which makes possible activated oxygen contents of only about 10% by weight in the PCS, the activated oxygen content according to the inventive method is variable and can be adjusted to values from 10% to 15.2% by weight and, in particular, from more than 14.5% to 15.2% by weight. According to the inventive dry method using a defined sodium carbonate monohydrate, the activated oxygen content in the PCS product can thus be controlled well and adapted to the respective market requirements or to different products. The inventive dry method guarantees practically a loss-free use of hydrogen peroxide and thus an essentially complete yield of activated oxygen. Expensive excesses of hydrogen peroxide can therefore be avoided and the reaction of sodium carbonate monohydrate with hydrogen peroxide can be carried out almost stoichiometrically. The PCS, produced according to the inventive method, is moreover distinguished by a high homogeneity and purity. The PCS particles, obtained pursuant to the invention, therefore have advantageous stability properties. The method is very flexible since, in contrast to the dry methods of the state of the art, for which tubular reactors are used, it can be carried out in conventional mixing and drying equipment. The flexibility of the inventive method is also seen therein that it can be carried out not only discontinuously, but also continuously and, at the same time, controlled well.

The following examples are intended to explain the invention further without, however, limiting its scope. Percentage data in the Tables and text usually is on a weight basis.

EXAMPLES

Example 1
Conditioning of Sodium Carbonate to Sodium Carbonate Monohydrate

For the production of sodium monohydrate, light sodium carbonate was conditioned in a Loedige laboratory mixer with heating jacket (waterbath, 99° C.). For this purpose, 2,000 g of sodium carbonate were filled into the mixer and pre-heated for 15 minutes at a low rpm (about 20 rpm). After that, the rpm of the mixer was increased to about 120 and boiling water was added swiftly in an amount of 520 g. After a residence time of about 35 minutes, the product was removed from the mixer. The reaction to sodium carbonate monohydrate was checked by DSC analysis and by titration of the total alkalinity.

Six batches of sodium carbonate monohydrate were produced (see also Example 3). The general conditions of the method as well as the average analytical results of the sodium carbonate monohydrate products obtained are given in the following Tables Ia and Ib.

TABLE Ia

Conditioning of Sodium Carbonate ($Na_2CO_3$) to Sodium Carbonate Monohydrate ($Na_2CO_3 \cdot H_2O$) in a Loedige Mixer

| | |
|---|---|
| $Na_2CO_3$ (light sodium carbonate) | 2,000 g (79.37% by weight) |
| $H_2O$ (boiling) | 520 g (20.63% by weight) |
| Molar ratio of $Na_2CO_3:H_2O$ | 1:1.53 |
| Preheating time of sodium carbonate (mixer) | 15 minutes |
| Method | Loedige laboratory mixer (120 rpm) |
| Addition time for $H_2O$ | average of 34 seconds (25 to 45 seconds) |
| Temperature of jacket heating | 99° |
| Reaction time | average of 38 minutes (38 to 45 minutes) |

TABLE Ib

Analysis and Properties of Sodium Carbonate Monohydrate (obtained by conditioning from sodium carbonate)

| | | |
|---|---|---|
| Endothermic DSC peak | average | 99° C. (94° to 102° C.) |
| | average | −403 J/g (−390 to −420 J/g) |
| $H_2O$ (total alkalinity) | average | 13.95% (13.45% to 14.23%) |
| $Na_2CO_3$ (total alkalinity) | average | 86.05% (86.55% to 85.77%) |
| Ratio of $Na_2CO_3:H_2O$ (from analysis) | average | 1:0.95 (1:0.92 to 1:0.98) |

Example 2
Preparation of Sodium Percarbonate

The sodium carbonate monohydrate, prepared in Example 1, was subsequently reacted with hydrogen peroxide to form sodium percarbonate. For this purpose, in each case a weighed amount (about 2,000 g) of sodium carbonate monohydrate was filled into a mixer with kneader (Loedige mixer). Per mole of sodium carbonate monohydrate weighed out, 1.5 moles of aqueous hydrogen peroxide (60% by weight) were weighed out and stabilized by the addition of Turpinal SL (60% by weight) (amount: 5.75% by weight of TEL (100%) based on hydrogen peroxide (100%)). The hydrogen peroxide solution, so stabilized, was sprayed through a two-material nozzle into the Loedige mixer. The spraying time was about 13 minutes at an rpm of the mixer of approximately 120. To control the temperature during the reaction, the mixer was cooled by tap water flowing through the jacket. After the reaction, the product was removed from the mixer and dried at 80° C. in a circulating air drying oven. The drying was concluded as soon as the water content or the activated oxygen content in the end product reached the desired value (less than about 0.2%; water determined by the Sartorius method). After the sodium percarbonate product formed had cooled, its quality was checked by the usual analyses for PCS.

Altogether, six batches of sodium carbonate monohydrate from Example 1 were reacted as described above. The general process conditions for the reaction experiments and the average results of the analyses of the sodium percarbonate obtained are summarized in the following Tables IIa and IIb.

Example 3
Further Experiments to Condition Sodium Carbonate and Produce PCS

Analogous to Examples 1 and 2, further experiments were carried out to produce PCS from sodium carbonate monohydrate. The individual process conditions and the properties of the educts and products are given in the following Table III.

TABLE IIa

Reaction of Sodium Carbonate Monohydrate with Hydrogen Peroxide to Form Sodium Percarbonate

| | |
|---|---|
| Method | Loedige laboratory mixer (approx. 100 rpm) with jacket cooling |
| Educts | $Na_2CO_3 \cdot H_2O$ (conditioning) $H_2O_2$ (w = 0.6) |
| Molar ratio of $Na_2CO_3:H_2O_2$ | 1:1.5 |
| Amount of Turpinal | 5.75% of TSL 100%, based on $H_2O_2$ being 100% |
| Temperature | Room temperature/water cooling |
| Addition time of $H_2O_2$ (2-material nozzle) | average of 13 minutes (12 to 14 minutes) |

TABLE IIa-continued

Reaction of Sodium Carbonate Monohydrate with
Hydrogen Peroxide to Form Sodium Percarbonate

| | |
|---|---|
| AVOX moist product | average of 11.43% (10.90% to 11.68%) |
| Drying temperature | Circulating air drying oven 80° C. |
| drying time | 150 to 180 min. |

TABLE IIb

Analysis and Properties of Sodium Percarbonate
Produced Pursuant to the Invention

| | |
|---|---|
| AVOX | average of 15.02% (14.98% to 15.06%) = 31.91% $H_2O_2$ |
| $H_2O$ (Sartorius) | average of 0.15% (0.07% to 0.33%) |
| $Na_2CO_3$ (total alkalinity) | average of 66.01% |
| NaCl | average of 0.1% (0.08%/0.09%) |
| Turpinal SL | average of 1.69% (0.501% P) |
| Total $H_2O/H_2O_2/Na_2CO_3$TSL/NaCl | 99.86% |
| Ratio of $Na_2CO_3:H_2O_2$ | 1:1.51 |
| DSC exothermic peak | average of 161° C. (159° to 162°) average of +133 J/g (+130 to +140 J/g) |
| Loss in stability 2 h/105° C. | average of 4.6% (3.4% to 5.1%) |

TABLE III

Further Experiments to Condition Sodium
Carbonate and Produce PCS Conditioning:

| | Experiment 3.1 | Experiment 3.2 |
|---|---|---|
| Conditioning: | | |
| $Na_2CO_3$ (Rheinberg light) | 2,000 g (79.37%) | 2,000 g (79.37%) |
| $H_2O$ (boiling) | 520 g (20.63%) | 520 g (20.63%) |
| Ratio of $Na_2CO_3:H_2O$ | 1:1.53 | 1:1.53 |
| Method | Loedige laboratory mixer (120 rpm) | Loedige laboratory mixer (120 rpm) |
| Addition time for $H_2O$ | 45 seconds | 40 seconds |
| Temperature | 99° C. | 99° C. |
| Time | 45 minutes | 40 minutes |
| $H_2O$ (total alkalinity) | 14% | 13.45% |
| $Na_2CO_3$ (total alkalinity) | 86% | 86.55% |
| $H_2O$ (Sartorius) | 13.52% | 13.48% |
| Ratio of $Na_2CO_3:H_2O$ (from analysis) | 1:0.96 | 1:0.92 |
| Reaction with Hydrogen Peroxide: | | |
| Method | Loedige laboratory mixer (approx. 100 rpm) | Loedige laboratory mixer (approx. 100 rpm) |
| Educts | 1,940 g $H_2O_2$ (w = 0.6)/TSL (w = 0.6) | 2,035 g $H_2O_2$ (w = 0.6)/TSL (w = 0.6) |
| Ratio of $Na_2CO_3:H_2O_2$ | 1:1.5 (1.338 g $H_2O_2$/76.9 g TSL) | 1:1.5 (1.412 g $H_2O_2$/8.12 g TSL) |
| Temperature | Room temperature/water cooling | Room temperature/water cooling |
| Time | 13 minutes | 12 minutes |
| Drying | Circulating air oven 80° C., 150 min. | Circulating air oven 80° C., 160 min. |
| Product yield | 2,089 g | 2,271 g |
| AVOX moist product | 10.90% | 11.62% |
| AVOX end product | 15.00% 14.95% 15.04% | 15.06% 15.04% |
| $H_2O$ (Sartorius) | 0.17% | 0.22% 0.43% |
| Loss in stability 2 h/105° C. | 5.1% | 4.9% |

TABLE III-continued

Further Experiments to Condition Sodium
Carbonate and Produce PCS Conditioning:

| | Experiment 3.3 | Experiment 3.4 |
|---|---|---|
| Conditioning: | | |
| $Na_2CO_3$ (Rheinberg light) | 2,000 g (79.37%) | 2,000 g (79.37%) |
| $H_2O$ (boiling) | 520 g (20.63%) | 520 g (20.63%) |
| Ratio of $Na_2CO_3:H_2O$ | 1:1.53 | 1:1.53 |
| Method | Loedige laboratory mixer (120 rpm) | Loedige laboratory mixer (120 rpm) |
| Addition time for $H_2O$ | 30 seconds | 35 seconds |
| Temperature | 99° C. | 99° C. |
| Time | 40 minutes | 35 minutes |
| $H_2O$ (total alkalinity) | 13.9% | 14.15% |
| $Na_2CO_3$ (total alkalinity) | 86.1% | 86.85% |
| $H_2O$ (Sartorius) | 13.83% | 13.98% |
| Ratio of $Na_2CO_3:H_2O$ (from analysis) | 1:0.95 | 1:0.97 |
| Reaction with Hydrogen Peroxide: | | |
| Method | Loedige laboratory mixer (approx. 100 rpm) | Loedige laboratory mixer (approx. 100 rpm) |
| Educts | 2,000 g $H_2O_2$ (w = 0.6)/TSL (w = 0.6) | 2.132 g $H_2O_2$ (w = 0.6)/TSL (w = 0.6) |
| Ratio of $Na_2CO_3:H_2O_2$ | 1:1.5 (1.381 g $H_2O_2$/79.4 g TSL) | 1:1.5 (1.468 g $H_2O_2$/84.4 g TSL) |
| Temperature | Room temperature/water cooling | Room temperature/water cooling |
| Time | 12 minutes | 14 minutes |
| Drying | Circulating air oven 80° C., 165 min. | Circulating air oven 80° C., 170 min. |
| Product yield | 2,193 g | 2,448 g |
| AVOX moist product | 11.68% | 11.42% |
| AVOX end product | 15.08% 15.04% | 15.00% 14.98% |
| $H_2O$ (Sartorius) | 0.06% 0.07% | 0.16% 0.17% |
| Loss in stability 2 h/105° C. | 5.1% | 4.7% |

| | Experiment 3.5 | Experiment 3.6 |
|---|---|---|
| Conditioning: | | |
| $Na_2CO_3$ (Rheinberg light) | 2,000 g (79.37%) | 2,000 g (79.37%) |
| $H_2O$ (boiling) | 520 g (20.63%) | 520 g (20.63%) |
| Ratio of $Na_2CO_3:H_2O$ | 1:1.53 | 1:1.53 |
| Method | Loedige laboratory mixer (120 rpm) | Loedige laboratory mixer (120 rpm) |
| Addition time for $H_2O$ | 25 seconds | 30 seconds |
| Temperature | 99° C. | 99° C. |
| Time | 35 minutes | 35 minutes |
| $H_2O$ (total alkalinity) | 14.23% | 13.96% |
| $Na_2CO_3$ (total alkalinity) | 85.77% | 86.04% |
| $H_2O$ (Sartorius) | 14.10% | 13.96% |
| Ratio of $Na_2CO_3:H_2O$ (from analysis) | 1:0.98 | 1:0.96 |
| Reaction with Hydrogen Peroxide: | | |
| Method | Loedige laboratory mixer (approx. 100 rpm) | Loedige laboratory mixer (approx. 100 rpm) |
| Educts | 2,073 g $H_2O_2$ (w = 0.6)/TSL (w = 0.6) | 2,066 g $H_2O_2$ (w = 0.6)/TSL (w = 0.6) |
| Ratio of $Na_2CO_3:H_2O_2$ | 1:1.5 (1.426 g $H_2O_2$/81.9 g TSL) | 1:1.5 (1.468 g $H_2O_2$/82.0 g TSL) |
| Temperature | Room temperature/water cooling | Room temperature/water cooling |
| Time | 13 minutes | 12 minutes |
| Drying | Circulating air oven 80° C., 175 min. | Circulating air oven 80° C., 180 min. |
| Product yield | 2,368 g | 2,252 g |

TABLE III-continued

Further Experiments to Condition Sodium
Carbonate and Produce PCS Conditioning:

| | | |
|---|---|---|
| AVOX moist product | 11.39% | 11.58% |
| AVOX end product | 15.04% 15.00% | 14.96% 15.00% |
| H$_2$O (Sartorius) | 0.08% 0.14% | 0.08% 0.06% |
| Loss in stability 2 h/105° C. | 4.2% | 3.4% |

Example 4
Compacting and Granulating Dry

The micro-crystalline sodium percarbonate, produced in Example 2 or 3, was subjected to compacting and subsequently to a dry granulation. The compacting was carried out in a compacting machine of the WP-50 N/75 type with a dry granulating unit made by Alexander-Werke. This equipment is suitable for continuously consolidating dry, powdery or finely crystalline products with a subsequent comminution (granulation) of the pressed product. It was possible to control the granulation of these scabs, obtained by compacting, by installing different screen inserts. For this purpose, screen inserts with mesh widths of 2.00, 1.25 and 1.00 mm were available.

Aside from the sodium percarbonates, prepared in Example 2 or 3, a sodium percarbonate, obtained by the crystallization method of the state of the art, was also compacted and granulated dry for comparison (the average particle size of this PCS was 500 µm). If so desired, 1.0% by weight of sodium stearate powder was added to the sodium percarbonate used for the compacting. By these means, when necessary, it was possible to improve the detaching of the scabs from the roll surface. The scabs then lifted up automatically, without the help of the installed stripper. The granulometry was not affected by the addition of sodium stearate.

To find advantageous process conditions, preliminary experiments were carried out in which, to begin with, product was supplied to the press at a constant rate while the pressure of the rollers was increased stepwise from 25 to 120 bar. The scabs, produced at high pressure, could be granulated well using a 1.25 mm screen insert. The granulate then consisted of approximately cuboid particles, which had a satisfactory strength. Below 50 bar, brittle scabs where formed, which easily disintegrated into powder while being granulated. When the rate of supplying product was increased, thicker scabs were formed. However, with increasing pressure, they chipped off increasingly from the roll. Roller pressures of 50 to 100 bar therefore proved to be advantageous.

The properties of the coarsely grained granulates of sodium percarbonate with an average particle diameter of 650 µm (or 873 µm when sodium stearate was added), produced by the above compacting and granulating using a screen insert with a mesh width of 1.25 mm, were investigated. The granulated products exhibited slight abrasion (less than 5% or less than 8% according to ISO 5.937), a low loss in dry stability (6% at 105° C., 2 hr) and a high dissolving rate (99% after 1 minute, 15° C.). The bulk density of the sodium percarbonate, produced pursuant to the invention, was of the order of 0.87 g/mL or 0.93 g/mL when sodium stearate was added. According to the results of the micro-calorimetric measurements (LKB) and the zeolite test, the PCS granulates, produced pursuant to the invention, have an advantageous shelf life in a detergent base. In the micro-calorimetric measurement, values of 49 µW/g or 57 µW/g (when sodium stearate was added) where obtained for the sodium percarbonate produced pursuant to the invention and, in the zeolite test, the residual oxygen content was about 50% or, when sodium stearate was added, 56% (in each case measured against the PBS-1 as standard). In order to obtain an overall view, the detailed results of the analyses of conventional sodium percarbonate (obtained by the crystallization method or its compacted form) and of sodium percarbonate products, produced pursuant to the invention with and without the addition of stearate, are summarized in the following Table IV.

TABLE IV

Properties of Sodium Percarbonates, Produced Pursuant to the Invention, and Comparison Experiments

| | 4.1* | 4.2* | V1* | V2* |
|---|---|---|---|---|
| AVOX (%) | 15.04 | 14.83 | 14.32 | 14.36 |
| NaCl (%) | 0.1 | 0.1 | 2.7 | 2.9 |
| H$_2$O (%) | 0.29 | 0.38 | 0.34 | 0.40 |
| Bulk density (kg/liter) | 0.870 | 0.933 | 1.005 | 0.915 |
| Grain analysis (%) | | | | |
| >1.400 mm | 1.6 | 7 | 1.2 | 5.0 |
| >1.000 mm | 19.6 | 34 | 9.8 | 32.0 |
| >0.850 mm | 13.1 | 13 | 5.5 | 14.8 |
| >0.600 mm | 16.6 | 14 | 13.5 | 13.4 |
| >0.425 mm | 12.8 | 9 | 20.1 | 9.2 |
| >0.250 mm | 14.8 | 8 | 27.1 | 8.4 |
| >0.150 mm | 10.4 | 7 | 12.4 | 4.8 |
| <0.150 mm | 10.8 | 8 | 10.4 | 12.4 |
| Average grain diameter (µm) | 648.8 | 827.9 | 511.4 | 787.5 |
| Abrasion (%) | 4.6 | 7.8 | 7.6 | 12.8 |
| Loss in stability (105° C., 2 h) (%) | 6.1 | 12.0 | 9.2 | 16.4 |
| Dissolving rate (2 g, 15° C.) (%) | | | | |
| 1 min | 99 | 96 | 82.8 | 79.0 |
| 2 min | 100 | 99 | 94.1 | 93.3 |
| 3 min | 100 | 100 | 97.9 | 96.7 |
| LKB**) (µW/g) | 49.6 | 57.1 | 54.7 | 86.3 |
| Zeolite test (%) | 50.3 | 55.8 | 41.1 | 38.7 |

4.1 = inventive PCS after compacting
4.2 = inventive PCS after compacting with the addition of sodium stearate
V1 = comparison experiment: properties of conventional commercial PCS, produced by a crystallization method
V2 = comparison experiment: PCS as in V1, however after additional compacting
*all samples original; and no screened fractions
**)Measurement of LKB values in a zeolite-containing detergents base
  Mixing ratio: 20% by weight of percarbonate and 80% by weight of detergents base Legend PCS=sodium percarbonate
Avox=activated oxygen (content)
Turpinal SL=60% aqueous solution of 1-hydroxyethane-1, 1-diphosphonic acid (HEDP); stabilizer for peroxide
Water glass=36% by weight solution of sodium silicate in water (8% by weight of Na$_2$O; 25.5% by weight of SiO$_2$)
IFB=integrated fluidized bed
h=hour
min.=minute
mmWS=mm of water column
P, dP=pressure, pressure difference
rpm=revolutions per minute
DSC=differential scanning calorimetry. DSC detects all processes, in which energy is consumed or produced, i.e. endothermic and exothermic phase transformations.
LKB measurements=heat flow measurements For these heat flow measurements, the heat flows occurring under isothermal conditions of measurements, are an indication of the stability of the activated oxygen-containing product; in particular, the stability of the product in the presence of detergent components can be determined, if heat flow measurements are carried out on samples, in which the activated oxygen-containing product is mixed with the detergent components. The heat flow measurements were carried out in an LKB 2277 Bio Activity Monitor at 40° C. over a period of 20 hours. The lower the heat flow that is measured, the higher is the stability of the activated oxygen-containing product in the detergent base and the more stable are the respective PCS particles.

Avox loss,
Avox
stability
Stability
loss=To determine the chemical stability of the sodium percarbonate produced, the activated oxygen loss (avox stability) was determined. For this purpose, the product was heated for 2 hours at 105° C. and the loss of activated oxygen, due to decomposition, was determined. The activated oxygen was determined by the usual titrimetric methods.

$H_2O$
(Sartorius)=Sample weight in each case=7.5 g; test temperature 60° C.; test end:<5 mg/90 seconds.

Zeolite test=Product (10 g) and 10 g of zeolite A (Aldrich 2 to 3 $\mu$m molecular sieve) are mixed; keep for 48 hours in an open petri dish at 32° C. and a relative humidity of 80%; characteristic zeolite number=residual AVOX of the sample after storage, divided by the residual AVOX or the standard PBS-1 after storage (PBS-1=sodium perborate monohydrate)

Abrasion test=The abrasion was determined according to ISO 5934; that is, the proportion of fines<150 $\mu$m, which are produced by swirling the sample in a perpendicular pipe by means of compressed air, was determined gravimetrically. The proportion of fines produced, as a percentage of the total amount, was a measure of the abrasion.

What is claimed is:

1. A method for producing sodium percarbonate, said method comprising the steps of:
    reacting solid sodium carbonate monohydrate obtained by conditioning a light form of sodium carbonate, with a quasi-stoichiometric amount, relative to the desired activated oxygen content in the sodium percarbonate, of concentrated aqueous hydrogen peroxide solution at a reaction temperature of up to 80° C. in a mixing apparatus with rapid and intensive mixing into a pasty or doughy composition of moist sodium percarbonate, and drying the moist sodium percarbonate to obtain a dry sodium percarbonate product, and
    compacting the dry sodium percarbonate product obtained in the preceding step to shells, breaking and screening the shells, and dry granulating the broken and screened material to obtain a sodium percarbonate granulate, said granulate having an activated oxygen content of 10% to 15.2% by weight, a bulk density of from 0.85 to 1.1 kg/liter, and an average particle diameter of from 550 to 1,100 $\mu$m.

2. A method according to claim 1, wherein said concentrated aqueous hydrogen peroxide solution is a 50% to 70% by weight solution.

3. A method according to claim 1, wherein up to 1% by weight of an alkali metal stearate or alkaline earth metal stearate lubricant is added to the sodium percarbonate before the compacting step.

4. A method according to claim 1, wherein said granulate has an active oxygen content in the range from 14.5% to 15.2% by weight.

5. A method according to claim 1, wherein the reaction temperature during the reacting step is maintained in the range from 20° C. to 80° C.

6. A method according to claim 1, wherein based on an empirical formula of $Na_2CO_3.1.5\ H_2O_2$ for sodium percarbonate, said quasi-stoichiometric amount of aqueous hydrogen peroxide solution comprises from 1.49 to 1.52 moles of hydrogen peroxide per mole of sodium percarbonate obtained.

7. A method according to claim 1, wherein said aqueous hydrogen peroxide solution is a 55% to 65% by weight hydrogen peroxide solution.

8. A method according to claim 1, wherein said reacting step is carried out by placing the solid sodium carbonate monohydrate in the mixer and spraying the hydrogen peroxide solution through a nozzle into the mixer during mixing.

9. A method according to claim 1, wherein the solid sodium carbonate monohydrate is obtained by conditioning light sodium carbonate having a bulk density of 0.50 to 0.55 kg/liter.

10. A method according to claim 1, wherein the solid sodium carbonate monohydrate is obtained by conditioning super light sodium carbonate having a bulk density less than 0.50 kg/liter.

11. A method according to claim 1, wherein the compacting is carried out at a pressure in the range from at least 50 bar to a maximum of 150 bar.

12. A method according to claim 11, wherein the compacting is carried out at a pressure in the range from 80 bar to 120 bar.

13. A method according to claim 1, wherein the sodium percarbonate granulate obtained has an average particle diameter of at least 600 $\mu$m.

14. A method according to claim 13, wherein the sodium percarbonate granulate obtained has an average particle diameter in the range from 640 $\mu$m to 1,000 $\mu$m.

15. A method according to claim 1, wherein the sodium percarbonate granulate obtained has a bulk density in the range from 0.93 to 1.1 kg/liter.

16. A method according to claim 12, wherein the compacting is carried out with the addition of up to a total of 1% by weight of at least one lubricant selected from the group consisting of sodium stearate and magnesium stearate.

17. Sodium percarbonate having an active oxygen content of from 14.5% to 15.2% by weight, calculated excluding any additives optionally added during production thereof, and having a dissolution rate under standard conditions of 2 g, 15° C., of at least 95% after 1 minute and at least 99% after 2 minutes.

18. Sodium percarbonate having an active oxygen content of from 14.5% to 15.2%, calculated excluding any additives optionally added during production thereof, and exhibiting an exothermic differential scanning calorimetry peak above 155° C.

19. Sodium percarbonate acording to claim 18, which exhibits an exothermic differential scanning calorimetry peak in the temperature range from 159° C. to 162° C.

20. Sodium percarbonate having an active oxygen content of from 14.5% to 15.2%, calculated excluding any additives optionally added during production thereof, and a stability loss measured under standard conditions of 105° C. and 2 hours of less than 6.2%.

21. Sodium percarbonate according to claim 20, having a stability loss in the range from 3.4% to 5.1% by weight, measured under standard conditions of 105° C. and 2 hours.

22. Sodium percarbonate according to claim 17, having an average particle diameter in the range from 550 to 1,100 µm.

23. Sodium percarbonate according to claim 22, having an average particle diameter in the range from 640 to 1,000 µm.

24. Sodium percarbonate according to claim 17, having a bulk density of 0.85 to 1.1 kg/liter.

25. Sodium percarbonate according to claim 17, having an abrasion value of less than 5%, measured under standard conditions.

26. Sodium percarbonate according to claim 17, comprising up to 1% by weight of a lubricant additive selected from the group consisting of alkali metal stearates and alkaline earth metal stearates, and having a bulk density in the range from 0.93 to 1.1 kg/liter.

27. Sodium percarbonate according to claim 26, having an abrasion value of less than 8%, measured under standard conditions.

28. Sodium percarbonate obtained by the method of claim 1.

29. Sodium percarbonate according to claim 28, characterized by being free of lubricant additives, and having a stability loss of less than 6.2%, measured under standard conditions of 105° C. and 2 hours.

30. Sodium percarbonate according to claim 28, characterized by being free of lubricant additives, and having an average particle diameter of 550 to 1,100 µm.

31. Sodium percarbonate according to claim 30, having an average particle diameter in the range from 640 µm to 1,000 µm.

32. Sodium percarbonate according to claim 28, characterized by being free of lubricant additives, and having a bulk density of 0.85 to 1.1 kg/liter.

33. Sodium percarbonate according to claim 32, having an abrasion value of less than 5%, measured under standard conditions.

34. Sodium percarbonate according to claim 28, containing up to 1% by weight of a lubricant additive, and having an active oxygen content of at least 14.5% by weight, and exhibiting a stability loss of at most 12.0% measured under standard conditions of 105° C. and 2 hours.

35. Sodium percarbonate according to claim 34, herein said lubricant additive is selected from the group consisting of alkali metal stearates and alkaline earth metal stearates, said sodium percarbonate having an active oxygen content of at least 14.8% by weight.

36. Sodium percarbonate according to claim 28, containing up to 1% by weight of a lubricant additive, and having an active oxygen content of 14.5% to 15% by weight and an average particle diameter of 800 to 1,000 µm.

37. Sodium percarbonate according to claim 36, wherein said lubricant additive is selected from the group consisting of alkali metal stearates and alkaline earth metal stearates, said sodium percarbonate having an active oxygen content of at least 14.8% by weight.

38. Sodium percarbonate according to claim 28, containing up to 1% by weight of a lubricant additive, and having an active oxygen content of 14.5% to 15% by weight, and having a bulk density of 0.93 to 1.1 kg/liter.

39. Sodium percarbonate according to claim 38, wherein said lubricant additive is selected from the group consisting of alkali metal stearates and alkaline earth metal stearates, said sodium percarbonate having an active oxygen content of at least 14.8% by weight.

40. Sodium percarbonate according to claim 38, having an abrasion value of at most 8%, measured under standard conditions.

41. A solid bleach or detergent composition comprising from 0.5 to 40% by weight of a sodium percarbonate according to claim 17, and 99.5% to 60% by weight of at least one further bleach or detergent ingredient selected from the group consisting of surfactants, builders, bleach activators, peracid bleach precursors, enzymes, enzyme stabilizers, anti-redeposition agents, compatibilization agents, complexing and chelating agents, soap foam regulators, optical brighteners, opacifiers, corrosion inhibitors, anti-static agents, dyes, and bactericides.

42. A solid bleach or detergent composition according to claim 41, comprising from 5 to 25% by weight of said sodium percarbonate and from 95 to 75% by weight of said at least one further bleach or detergent ingredient.

43. A solid bleach or detergent composition according to claim 41, wherein said at least one further bleach or detergent ingredient comprises a zeolite builder.

44. A composition according to claim 41, wherein said composition is a compact detergent composition.

* * * * *